(12) United States Patent
Tachi et al.

(10) Patent No.: US 11,463,808 B2
(45) Date of Patent: Oct. 4, 2022

(54) ACTIVE NOISE CONTROL SYSTEM

(71) Applicants: ALPS ALPINE CO., LTD., Tokyo (JP); A School Corporation Kansai University, Suita (JP)

(72) Inventors: Ryosuke Tachi, Iwaki (JP); Yoshinobu Kajikawa, Suita (JP)

(73) Assignees: ALPS ALPINE CO., LTD, Tokyo (JP); A SCHOOL CORPORATION KANSAI UNIVERSITY, Osaka (JP)

( * ) Notice: Subject to any disclaimer, the term of this patent is extended or adjusted under 35 U.S.C. 154(b) by 0 days.

(21) Appl. No.: 17/391,753

(22) Filed: Aug. 2, 2021

(65) Prior Publication Data

US 2022/0046358 A1 Feb. 10, 2022

(30) Foreign Application Priority Data

Aug. 6, 2020 (JP) .............................. JP2020-134201

(51) Int. Cl.
| | |
|---|---|
| H04R 3/04 | (2006.01) |
| B60N 2/879 | (2018.01) |
| B60R 11/02 | (2006.01) |
| H04R 3/12 | (2006.01) |
| H04R 5/02 | (2006.01) |
| H04R 5/04 | (2006.01) |

(52) U.S. Cl.
CPC ............. H04R 3/04 (2013.01); B60N 2/879 (2018.02); B60R 11/0217 (2013.01); B60R 11/0247 (2013.01); H04R 3/12 (2013.01); H04R 5/02 (2013.01); H04R 5/04 (2013.01); H04R 2499/13 (2013.01)

(58) Field of Classification Search
None
See application file for complete search history.

(56) References Cited

U.S. PATENT DOCUMENTS

| | | | |
|---|---|---|---|
| 5,381,485 A | 1/1995 | Elliott | |
| 10,672,378 B1 * | 6/2020 | Bastyr | .............. G10K 11/17817 |
| 11,152,010 B2 * | 10/2021 | Miyamoto | ............. G10K 11/16 |
| 2009/0097669 A1 | 4/2009 | Kamiya | |
| 2020/0211526 A1 * | 7/2020 | Tachi | ............... G10K 11/17854 |
| 2020/0245066 A1 * | 7/2020 | Miyamoto | ............... H04R 3/14 |

FOREIGN PATENT DOCUMENTS

| | | |
|---|---|---|
| JP | 2018-072770 | 5/2018 |
| JP | 2020-012917 | 1/2020 |
| WO | 2020/148244 A1 | 7/2020 |

OTHER PUBLICATIONS

Extended European Search Report dated Dec. 22, 2021 in EP Application No. 21188146.1, 7 pages.

* cited by examiner

*Primary Examiner* — Paul W Huber
(74) *Attorney, Agent, or Firm* — Crowell & Moring

(57) ABSTRACT

A first seat noise control device corrects sound collected by a microphone to sound at a listening position of a user seated on a first seat, generates a cancel sound that cancels, at the first seat, the sound of a second seat audio source output from a second seat speaker by using an adaptive filter, and outputs the cancel sound from a first seat speaker. A second seat noise control device corrects the sound collected by the microphone to sound at the listening position of the user seated on the second seat, generates a cancel sound that cancels, at the second seat, the sound of a first seat audio source output from the first seat speaker using an adaptive filter, and outputs the cancel sound from the second seat speaker.

19 Claims, 6 Drawing Sheets

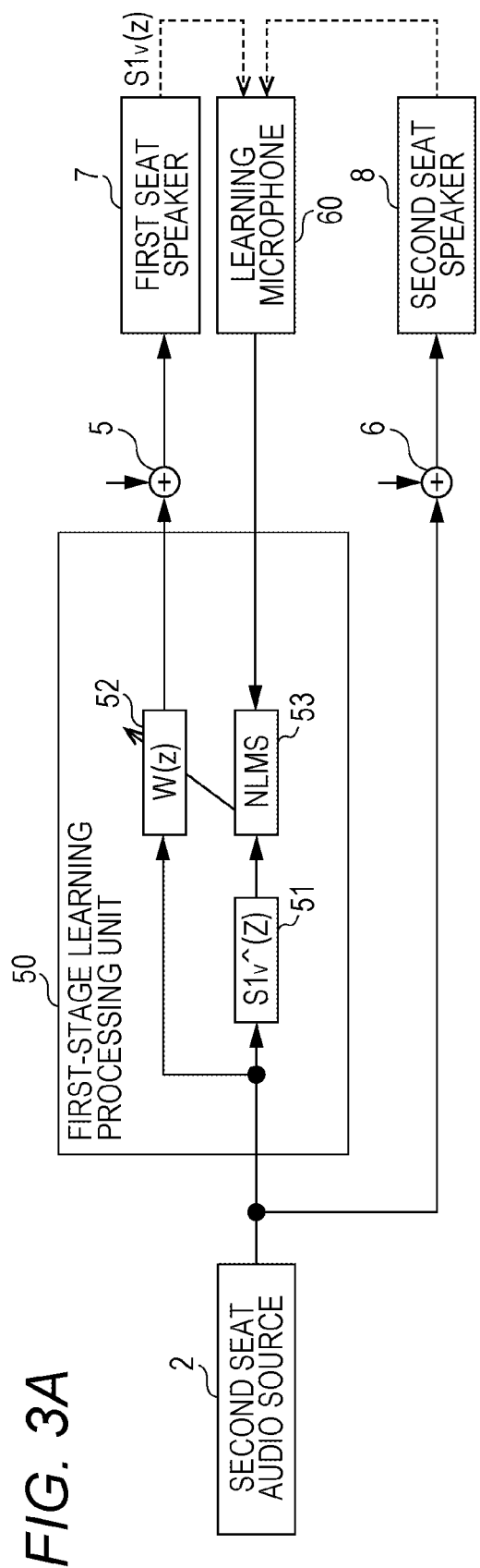
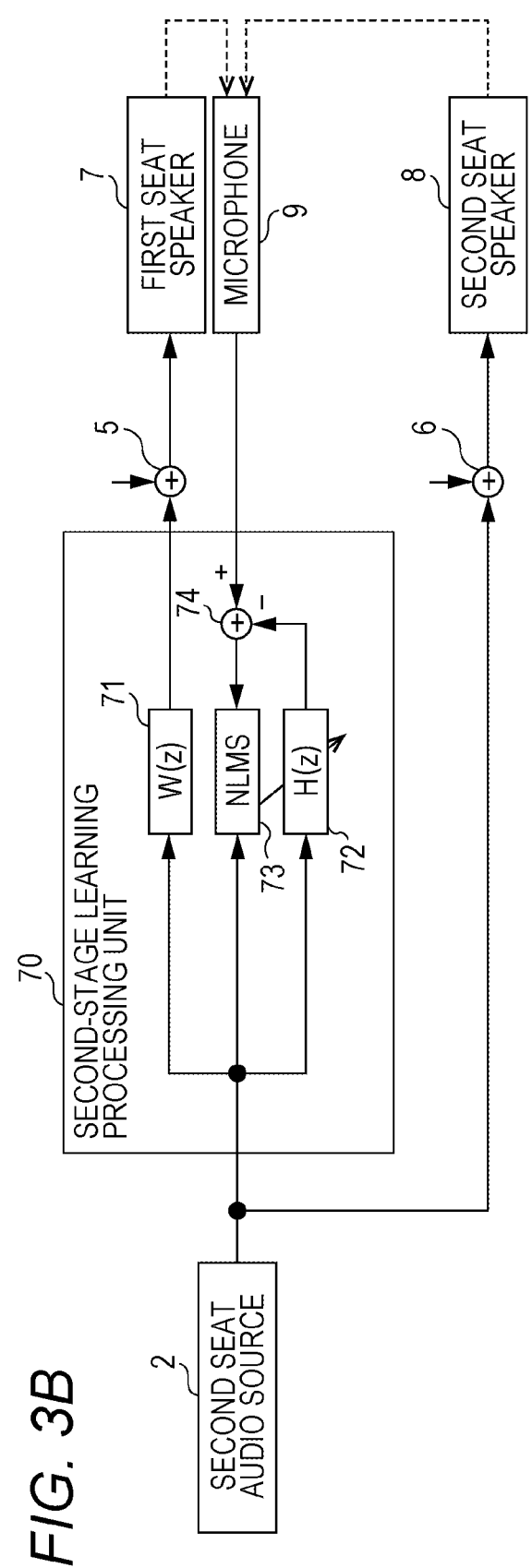

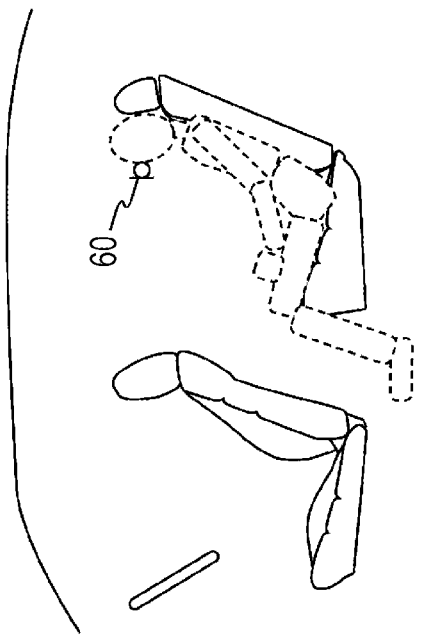
FIG. 4A1
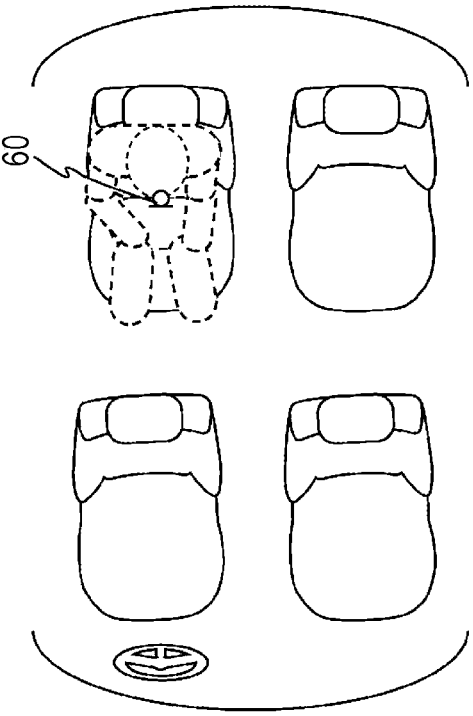
FIG. 4A2
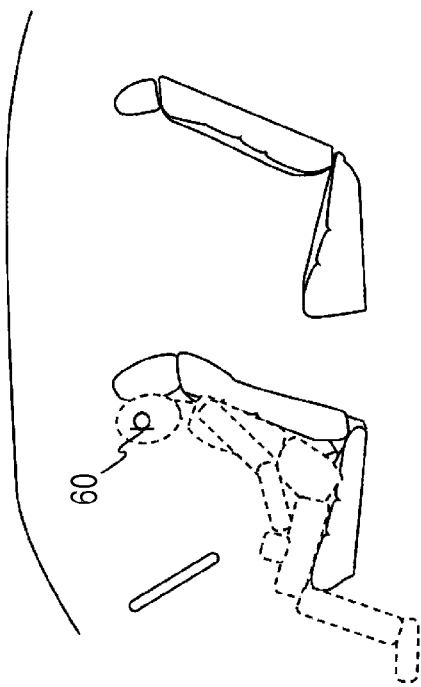
FIG. 4B1
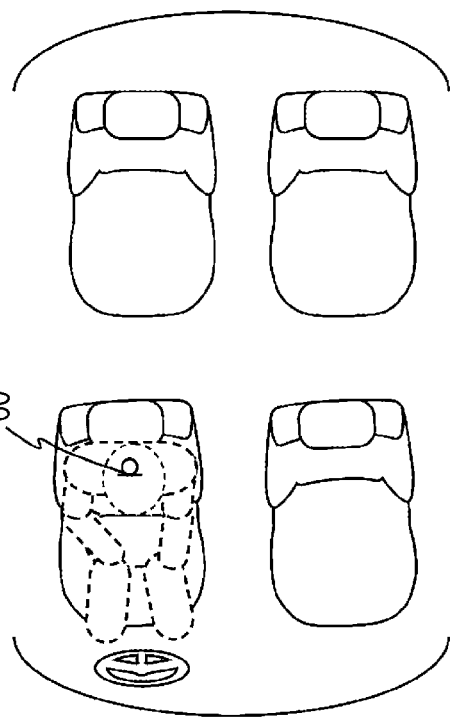
FIG. 4B2

FIG. 6A1
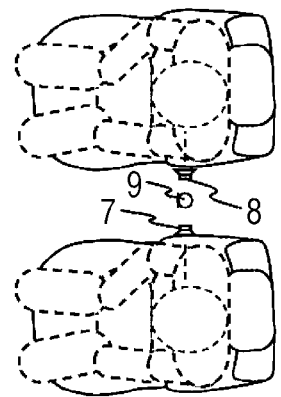
FIG. 6A2
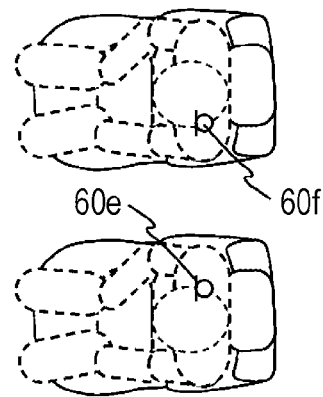
FIG. 6B1
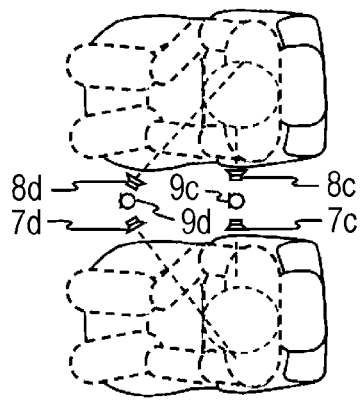
FIG. 6B2
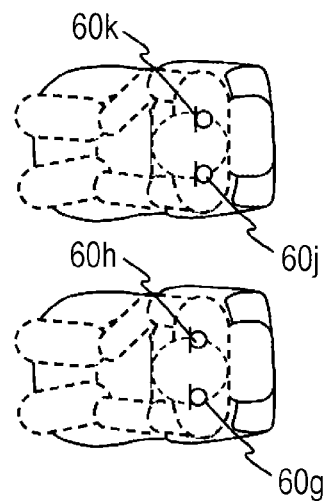

ACTIVE NOISE CONTROL SYSTEM

RELATED APPLICATION

The present application claims priority to Japanese Patent Application Number 2020-134201, filed Aug. 6, 2020, the entirety of which is hereby incorporated by reference.

BACKGROUND

1. Field of the Invention

The present invention relates to an active noise control (ANC) technology that reduces noise by emitting noise-canceling sound to cancel out noise.

2. Description of the Related Art

An active noise control (ANC) technology for reducing noise by emitting a noise cancel sound that cancels noise is known. The active noise control technology includes: a microphone disposed in a vicinity of a noise cancel position; a speaker that outputs a cancel sound that cancels noise at the noise cancel position; and an adaptive filter that generates a cancel sound output from the speaker by applying a transfer function adaptively set to an output signal of a noise source or a signal obtained by simulating the output signal. The adaptive filter adaptively sets a transfer function using an auxiliary filter with a signal obtained by correcting the output of the microphone as an error signal (for example, JP 2020-12917 A and JP 2018-72770 A).

In this technique, in the auxiliary filter, a transfer function that corrects a signal actually output by the microphone is set to a signal output from the microphone when the microphone is arranged at the noise cancel position, the signal having been learned in advance using the microphone for learning arranged at the noise cancel position. By using such an auxiliary filter, the noise is canceled at the noise cancel position different from the position of the microphone.

In an environment in which a user on a first seat and a user on a second seat output the sound of a first sound source from a speaker for the first seat and output the sound of a second sound source from a speaker for the second seat in order to enjoy different pieces of music or the like, when the above-described active noise control technology is applied to prevent each user from listening to the sound from the sound source that another user is listening to, the following problem occurs.

That is, first, a microphone is required for each seat, and the scale and cost of the system increase. Further, for example, in a case where the first seat and the second seat are arranged in the front-rear direction, and a speaker that outputs a cancel sound to the user at each seat is incorporated in each seat, even if the listening position of the sound of the user is displaced to a position in front of the noise cancel position set for the front seat, attenuation of the sound of the second sound source heard from the rear seat direction is also increased with the displacement for the user at the front seat. Therefore, it is difficult to feel that the effect of cancellation of the sound of the second sound source by the cancel sound is weakened with the displacement. However, for the user at the rear seat, if the listening position of the sound of the user is displaced to the front of the noise cancel position set for the rear seat, the sound of the first sound source heard from the front seat direction is increased with the displacement, and thus a sense of discomfort due to the weakened effect of cancellation of the sound of the second sound source by the cancel sound is largely felt.

SUMMARY

Therefore, an object of the present disclosure is to cancel the noise for the users by applying the active noise control technology to each of the users of the aligned seats in a simple configuration.

In addition, an object of the present disclosure is to apply an active noise control technology to each user of the adjacent seats to cancel noise for the user, and to suppress the occurrence of discomfort due to a weakened cancel effect accompanying the movement of the head of the user.

In order to achieve the above object, the present disclosure provides an active noise control system applied to an environment in which a first sound that is a sound of a first sound source is output to a user seated on a first seat and a second sound that is a sound of a second sound source is output to a user seated on a second seat, the active noise control system including: a first speaker; a second speaker; a microphone; a first noise control device configured to output, from the first speaker, a first cancel sound that is a sound for canceling the second sound to the user seated on the first seat; and a second noise control device configured to output, from the second speaker, a second cancel sound that is a sound for canceling the first sound to the user seated on the second seat.

Here, the first noise control device includes: a first auxiliary filter configured to receive the second sound as an input; a first correction unit configured to correct an output of the microphone using an output of the first auxiliary filter and output a first error signal; and a first adaptive filter configured to receive the second sound as an input and perform an adaptive operation of updating a transfer function of the first adaptive filter with the first error signal as an error to generate the first cancel sound. Further, a transfer function obtained in advance is set in the first auxiliary filter as a transfer function in which a component of the second sound included in the output of the microphone is corrected to a component of the second sound included in a sound transferred to a first cancel position that is a position that can be a listening position of a sound of the user seated on the first seat by correction of the first correction unit using the output of the first auxiliary filter.

The second noise control device includes: a second auxiliary filter configured to receive the first sound as an input; a second correction unit configured to correct the output of the microphone using an output of the second auxiliary filter and output a second error signal; and a second adaptive filter configured to receive the first sound as an input and perform an adaptive operation of updating a transfer function of the second adaptive filter with the second error signal as an error to generate the second cancel sound. The second auxiliary filter is set with a transfer function obtained in advance as a transfer function in which a component of the first sound included in the output of the microphone is corrected to a component of the first sound included in a sound transferred to a second cancel position that is a position that can be a listening position of a sound of the user seated on the second seat by correction of the second correction unit using the output of the second auxiliary filter.

According to such an active noise control system, when the first sound and the second sound are uncorrelated, the first sound to be output to the first seat can be canceled at the second seat, and the second sound to be output to the second seat can be canceled at the first seat without providing a microphone for each seat.

In the active noise control system, the microphone may be disposed at a position between the first speaker and the second speaker in a predetermined direction that faces from the first seat to the second seat.

Alternatively, in these active noise control systems, the first speaker, the microphone, and the second speaker may be disposed between a listening position of the sound of the user seated on the first seat and a listening position of the sound of the user seated on the second seat in a predetermined direction that faces from the first seat to the second seat. The microphone may be disposed at a position between the first speaker and the second speaker in the predetermined direction. The first sound may be output from the first speaker to the user seated on the first seat, and the second sound is output from the second speaker to the user seated on the second seat.

By doing so, the first speaker and the second speaker that output the first cancel sound and the second cancel sound can be shared with the output of the first sound and the second sound, and the configuration of the system as a whole can be simplified.

In the active noise control system described above, the second seat may be a seat behind the first seat, the second seat being aligned with the first seat in a front-rear direction, and the first speaker, the microphone, and the second speaker may be provided at the first seat.

In this case, the first speaker and the microphone may be provided in a headrest of the first seat, and the second speaker may be provided in a headrest or a seat back of the first seat.

Alternatively, in the active noise control system described above, the second seat may be a seat aligned with the first seat in a left-right direction. At least one of the first speaker, the microphone, and the second speaker of the active noise control system may be disposed on a ceiling in a vehicle interior of the automobile. Here, when the second speaker is disposed between the listening position of the sound of the user seated on the first seat and the listening position of the sound of the user seated on the second seat, and the second sound is output from the second speaker toward the second seat, the active noise control system may set the second seat as a seat behind the first seat, the second seat being aligned with the first seat in a front-rear direction, and the first cancel position as a standard sound listening position of the user seated on the first seat, and the second cancel position as a position in front of the standard sound listening position of the user seated on the second seat and behind the first seat.

With this configuration, the first sound can be satisfactorily canceled when the listening position of the user seated on the second seat is at the second cancel position in front of the standard sound listening position. Further, in a case where the listening position of the user seated on the second seat is at a position behind the second cancel position such as the standard listening position, the first sound heard from the front of the listening position is also smaller than that when the listening position is at the second cancel position. Therefore, the occurrence of discomfort due to the weakened cancel effect caused by the listening position of the user being behind the second cancel position is suppressed.

In addition, the present disclosure provides an in-vehicle system that is mounted in an automobile having a first seat and a second seat that is a seat behind the first seat, the in-vehicle system including: a first sound output unit that outputs a first sound that is a sound of a first sound source to a user seated on the first seat; a second sound output unit that outputs a second sound that is a sound of a second sound source to a user seated on the second seat; a first noise control unit that outputs a first cancel sound that is a sound that most cancels the second sound at a first cancel position that is a standard sound listening position of the user seated on the first seat; and a second noise control unit that outputs a second cancel sound that is a sound that most cancels the first sound at a second cancel position that is a position ahead of a standard sound listening position of the user seated on the second seat and behind the first seat.

According to such an in-vehicle system, the first sound can be satisfactorily canceled when the listening position of the user seated on the second seat is at the second cancel position in front of the standard sound listening position. In addition, in a case where the listening position of the user seated on the second seat is at a position behind the second cancel position such as the standard listening position, the first sound heard from the direction of the first seat in front is also smaller. Therefore, the occurrence of discomfort due to the weakened cancel effect caused by the deviation of the listening position of the user from the second cancel position is suppressed.

As described above, according to the present disclosure, with a simple configuration, it is possible to cancel the noise for the user by applying the active noise control technology to each of the users of the aligned seats.

Further, it is possible to apply the active noise control technology to each of the users of the aligned seats to cancel the noise for the user, and to suppress the occurrence of discomfort due to the weakening of the cancellation effect accompanying the movement of the head of the user.

BRIEF DESCRIPTION OF THE DRAWINGS

FIGS. 3A and 3B are block diagrams illustrating a configuration of learning of a transfer function of an auxiliary filter according to the embodiment of the present invention;

FIGS. 4A1, 4A2, 4B1, and 4B2 are diagrams illustrating arrangement examples of a learning microphone according to the embodiment of the present invention;

FIGS. 6A1, 6A2, 6B1, and 6B2 are diagrams illustrating other arrangement examples of speakers and microphones in the in-vehicle system according to the embodiment of the present invention.

DETAILED DESCRIPTION OF THE PREFERRED EMBODIMENTS

Figure 1:
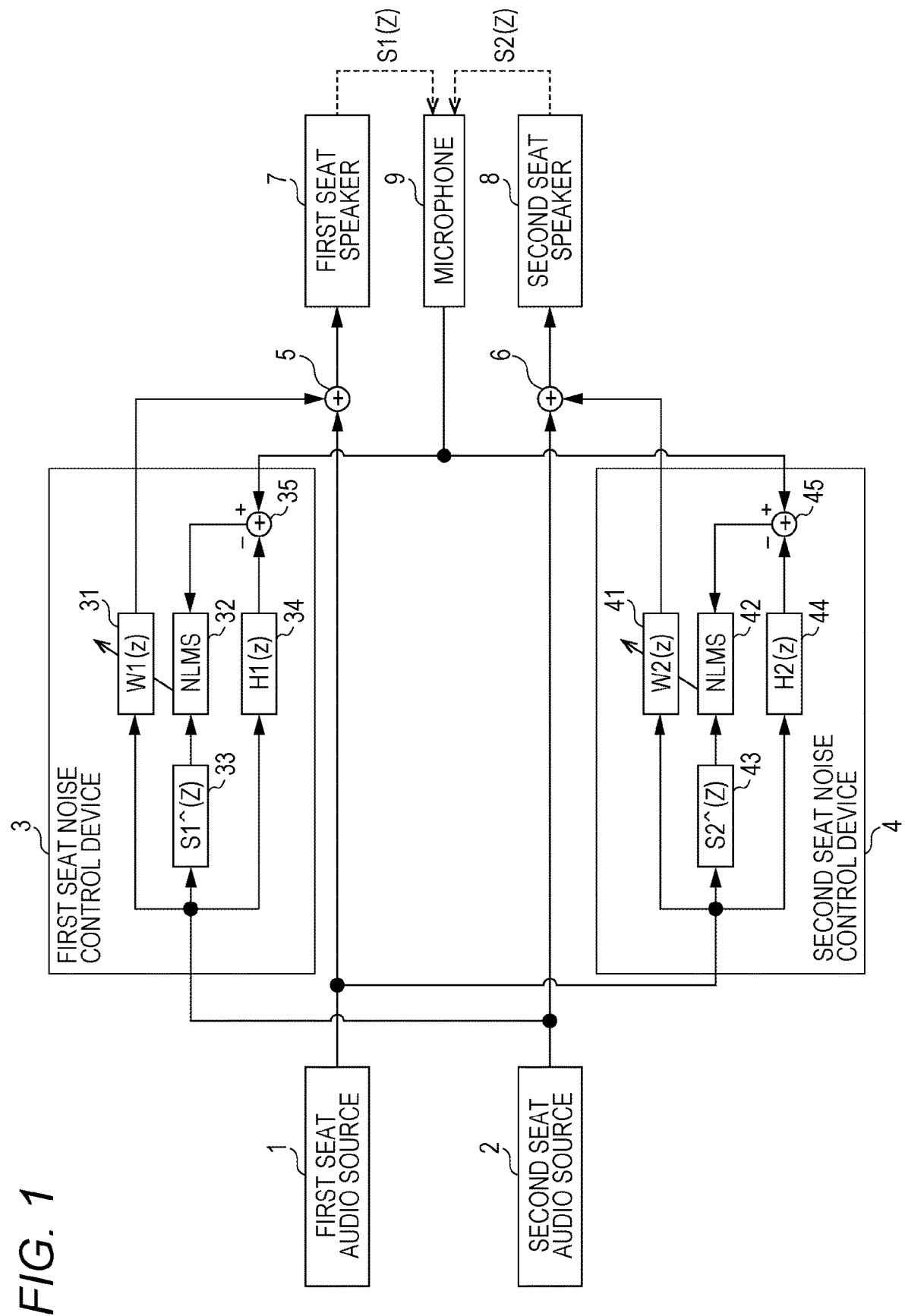
FIG. 1 is a block diagram illustrating a configuration of an in-vehicle system according to an embodiment of the present invention.

In the following, an embodiment of the present invention will be described. FIG. 1 illustrates a configuration of an in-vehicle system according to the present embodiment. As illustrated in the drawing, the in-vehicle system is a system which is mounted in an automobile and includes a first seat audio source 1, a second seat audio source 2, a first seat noise control device 3, a second seat noise control device 4, a first seat adder 5, a second seat adder 6, a first seat speaker 7, a second seat speaker 8, and a microphone 9.

Figure 2A:
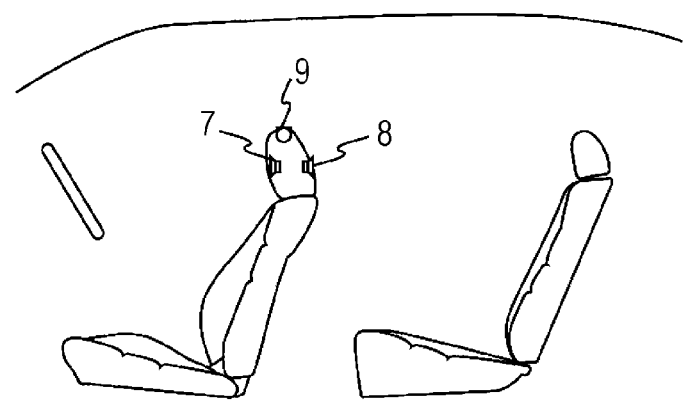
FIGS. 2A and 2B are diagrams illustrating an arrangement of speakers and a microphone in the in-vehicle system according to the embodiment of the present invention.
Figure 2B:
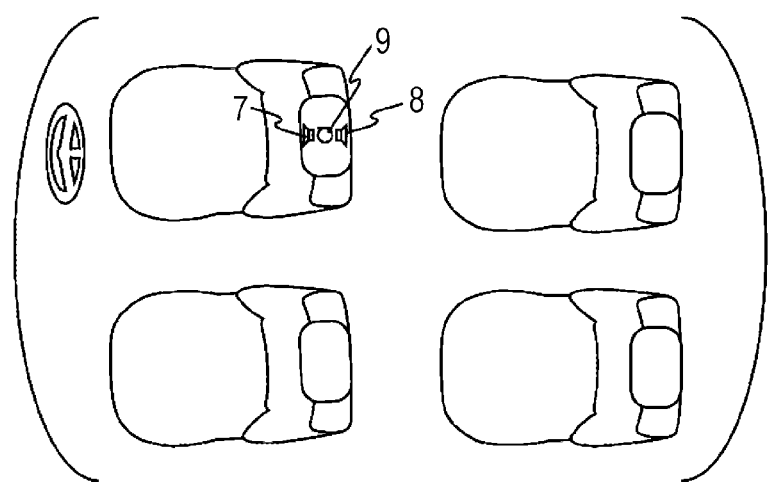

The first seat is one of front seats of an automobile, and the second seat is a rear seat immediately behind the first seat. In the following description, it is assumed that the first seat is a driver's seat and the second seat is a rear seat immediately behind the driver's seat. As illustrated in FIGS. 2A and 2B, the first seat speaker 7 is disposed at the front of the headrest of the driver's seat so as to emit sound forward, and the second seat speaker 8 is disposed at the rear of the headrest of the driver's seat so as to emit sound backward.

The microphone 9 is disposed in the headrest of the driver's seat such that its position in the front-rear direction is between the first seat speaker 7 and the second seat speaker 8. Returning to FIG. 1, the first seat audio source 1 is a sound source that outputs a sound of music or the like that is listened to by the user at the first seat, and the sound output from the first seat audio source 1 is output from the first seat speaker 7 via the first seat adder 5.

The second seat audio source 2 is a sound source that outputs a sound of music or the like that is listened to by the user at the second seat, and the sound output from the second seat audio source 2 is output from the second seat speaker 8 via the second seat adder 6.

The sound of the second seat audio source 2 and the sound collected by the microphone 9 are input to the first seat noise control device 3, and the first seat noise control device 3 generates, from these input sounds, a cancel sound that cancels the sound of the second seat audio source 2 best at a standard listening position of the sound of the user seated on the first seat, and outputs the cancel sound from the first seat speaker 7 via the first seat adder 5.

The sound of the first seat audio source 1 and the sound collected by the microphone 9 are input to the second seat noise control device 4, and the second seat noise control device 4 generates, from these input sounds, a cancel sound that cancels the sound of the first seat audio source 1 best at a position slightly ahead of the standard listening position of the sound of the user seated on the second seat, and outputs the cancel sound from the second seat speaker 8 via the second seat adder 6.

The first seat noise control device 3 includes a first seat variable filter 31, a first seat adaptive algorithm execution unit 32, a first seat estimation filter 33 in which a transfer function $S1\hat{}(z)$ is set in advance, a first seat auxiliary filter 34 in which a transfer function $H1(z)$ is set in advance, and a first seat subtractor 35.

The sound input from the second seat audio source 2 to the first seat noise control device 3 passes through the first seat variable filter 31 and is output as a cancel sound from the first seat speaker 7 via the first seat adder 5.

The sound input from the second seat audio source 2 to the first seat noise control device 3 is transmitted to the first seat subtractor 35 through the first seat auxiliary filter 34. The first seat subtractor 35 subtracts the output of the first seat auxiliary filter 34 from the sound collected by the microphone 9 and transmits the subtracted sound to the first seat adaptive algorithm execution unit 32. The transfer function $H1(z)$ is preset in the first seat auxiliary filter 34. The transfer function $H1(z)$ corrects the signal actually output from the microphone 9 so that the output from the first seat subtractor 35 becomes the signal output from the microphone 9 when the microphone 9 is located at the standard listening position of the user at the first seat. A method of setting the transfer function $H1(z)$ of the first seat auxiliary filter 34 will be described later.

An estimated transfer characteristic $S1\hat{}(z)$ obtained by estimating a transfer function $S1(z)$ from the first seat noise control device 3 to the microphone 9 by actual measurement or the like is preset in the first seat estimation filter 33. The first seat estimation filter 33 convolutes the transfer characteristic $S1\hat{}(z)$ with the sound from the input second seat audio source 2, and outputs the convolved sound to the first seat adaptive algorithm execution unit 32.

The first seat variable filter 31, the first seat adaptive algorithm execution unit 32, and the first seat estimation filter 33 constitute a Filtered-X adaptive filter. The first seat adaptive algorithm execution unit 32 uses the signal obtained by convolving the transfer function $S1\hat{}(z)$ with the first seat estimation filter 33 to execute an adaptive algorithm such as NLMS or LMS using the signal output from the first seat subtractor 35 as an error, thereby performing an adaptive operation of updating a transfer function $W1(z)$ of the first seat variable filter 31. As a result, since the sound of the second seat audio source 2 used for adaptation by the first seat adaptive algorithm execution unit 32 has no correlation with the sound of the first seat audio source 1, the first seat variable filter 31 is adapted to output a cancel sound that cancels the sound output from the second seat audio source at the standard listening position of the user at the first seat.

Next, the second seat noise control device 4 includes a second seat variable filter 41, a second seat adaptive algorithm execution unit 42, a second seat estimation filter 43 in which a transfer function $S2\hat{}(z)$ is set in advance, a second seat auxiliary filter 44 in which a transfer function $H2(z)$ is set in advance, and a second seat subtractor 45.

The sound input from the first seat audio source 1 to the second seat noise control device 4 passes through the second seat variable filter 41 and is output as a cancel sound from the second seat speaker 8 via the second seat adder 6.

The sound input from the first seat audio source 1 to the second seat noise control device 4 is transmitted to the second seat subtractor 45 through the second seat auxiliary filter 44. The second seat subtractor 45 subtracts the output of the second seat auxiliary filter 44 from the sound collected by the microphone 9 and transmits the subtracted sound to the second seat adaptive algorithm execution unit 42. The transfer function $H2(z)$ is preset in the second seat auxiliary filter 44. The transfer function $H2(z)$ corrects a signal actually output by the microphone 9 so that the output from the second seat subtractor 45 becomes a signal output from the microphone 9 when the microphone 9 is located at a position slightly ahead of the standard listening position of the second seat user. A method of setting the transfer function $H2(z)$ of the second seat auxiliary filter 44 will be described later.

An estimated transfer characteristic $S2\hat{}(z)$ obtained by estimating the transfer function $S2(z)$ from the second seat noise control device 4 to the microphone 9 by actual measurement or the like is preset in the second seat estimation filter 43. The second seat estimation filter 43 convolutes the transfer characteristic $S2\hat{}(z)$ with the sound from the input first seat audio source 1, and outputs the convolved sound to the second seat adaptive algorithm execution unit 42.

The second seat variable filter 41, the second seat adaptive algorithm execution unit 42, and the second seat estimation filter 43 constitute a Filtered-X adaptive filter. The second seat adaptive algorithm execution unit 42 uses the signal obtained by convolving the transfer function $S2\hat{}(z)$ with the second seat estimation filter 43 to execute an adaptive algorithm such as NLMS or LMS using the signal output from the second seat subtractor 45 as an error, thereby performing an adaptive operation of updating the transfer function W2(z) of the second seat variable filter 41.

As a result, since the sound of the first seat audio source 1 used for adaptation by the second seat adaptive algorithm execution unit 42 has no correlation with the sound of the second seat audio source 2, the second seat variable filter 41 is adapted to output a cancel sound that cancels the sound output from the first seat audio source at a position slightly ahead of the listening position of the user at the second seat.

Next, a method for setting the transfer function H1(z) of the first seat auxiliary filter 34 of the first seat noise control device 3 will be described. The transfer function H1(z) of the first seat auxiliary filter 34 is set in advance by, for example, the following first-stage learning processing and second-stage learning processing. The first-stage learning processing is performed in a configuration in which a first-stage learning processing unit 50 illustrated in FIG. 3A replaces the first seat noise control device 3 in the in-vehicle system of FIG. 1, and a learning microphone 60 is connected to the first-stage learning processing unit 50.

As illustrated in FIGS. 4A1 and 4A2, the learning microphone 60 is disposed and used at a standard sound listening position of the user seated on the first seat as the driver's seat. Returning to FIG. 3A, the first-stage learning processing unit 50 includes a learning estimation filter 51 in which the estimation value $S1\hat{v}(z)$ of the transfer function $S1v(z)$ from the first-stage learning processing unit 50 to the learning microphone 60 is set, a first-stage learning variable filter 52, and a first-stage learning adaptive algorithm execution unit 53.

In this configuration, the sound output from the second seat audio source 2 is input to the learning estimation filter 51 and the first-stage learning variable filter 52, and the output from the first-stage learning variable filter 52 is output to the first seat speaker 7. In addition, the first-stage learning variable filter 52, the learning estimation filter 51, and the first-stage learning adaptive algorithm execution unit 53 constitute a Filtered-X adaptive filter, and the first-stage learning adaptive algorithm execution unit 53 uses the output of the learning estimation filter 51 to execute an adaptive algorithm such as NLMS or LMS with the output of the learning microphone 60 as an error, and updates the transfer function W(z) of the first-stage learning variable filter 52.

Then, the adaptive algorithm is executed to obtain the stably converged transfer function W(z) of the first-stage learning variable filter 52 as a result of the first-stage learning processing. Next, the second-stage learning processing is performed in a configuration in which the first seat noise control device 3 is replaced with a second-stage learning processing unit 70 illustrated in FIG. 3B in the in-vehicle system of FIG. 1. The second-stage learning processing unit 70 includes a fixed filter 71 in which the transfer function W(z) obtained as a result of the first-stage learning processing is set as a transfer function, a second-stage learning variable filter 72, a second-stage learning adaptive algorithm execution unit 73, and a second-stage learning subtractor 74.

In this configuration, the sound output from the second seat audio source 2 is output to the first seat speaker 7 through the fixed filter 71. The sound output from the second seat audio source 2 is transmitted to the second-stage learning subtractor 74 through the second-stage learning variable filter 72, and the second-stage learning subtractor 74 subtracts the output of the second-stage learning variable filter 72 from the signal picked up by the microphone 9 and outputs the subtracted signal.

The second-stage adaptive algorithm execution unit executes an adaptive algorithm such as NLMS or LMS with the output of the second-stage learning subtractor 74 as an error, and updates the transfer function H(z) of the second-stage learning variable filter 72.

The adaptive algorithm is executed to set the converged stable transfer function H(z) as the transfer function H1(z) for the first seat auxiliary filter 34 of the first seat noise control device 3. The transfer function H1(z) thus learned is a transfer function in which it can be expected that the output of the first seat subtractor 35 becomes a signal output from the microphone 9 when the microphone 9 is located at the standard listening position of the user at the first seat in the first seat noise control device 3 as described above.

Similarly to the case of the transfer function H1(z) of the first seat auxiliary filter 34, the transfer function H2(z) of the second seat auxiliary filter 44 of the second seat noise control device 4 is set by performing the first-stage learning in the configuration in which the second seat noise control device 4 is replaced with the first-stage learning processing unit 50 illustrated in FIG. 3A and the learning microphone 60 is connected to the first-stage learning processing unit 50 in the in-vehicle system of FIG. 1, and performing the second-stage learning processing in the configuration in which the second seat noise control device 4 is replaced with the second-stage learning processing unit 70 illustrated in FIG. 3B in the in-vehicle system of FIG. 1.

In the first-stage learning processing of the transfer function H2(z) performed by the second seat auxiliary filter 44, the second seat audio source 2 in FIGS. 3A and 3B is the first seat audio source 1, the first seat speaker 7 is the second seat speaker 8, the first seat adder 5 is the second seat adder 6, and the second seat adder 6 is the first seat adder 5. In the first-stage learning processing of the transfer function H2(z) of the second seat auxiliary filter 44, as illustrated in FIGS. 4B1 and 4B2, the learning microphone 60 is disposed at a position slightly in front of the standard sound listening position of the user seated on the second seat, which is the seat immediately behind the driver's seat. Note that, in the learning estimation filter 51 of the first-stage learning processing unit 50, an estimation value of the transfer function $S1v(z)$ from the first-stage learning processing unit 50 to the learning microphone 60 arranged as illustrated in FIGS. 4B1 and 4B2 is set.

The transfer function H(z) of the second-stage learning variable filter 72 of the second-stage learning processing unit 70 converged and stabilized in the second-stage learning processing is set as the transfer function H2(z) of the second seat auxiliary filter 44 of the second seat noise control device 4.

The transfer function H2(z) thus learned is a transfer function in which it can be expected that the output of the second seat subtractor 45 becomes a signal output from the microphone 9 when the microphone 9 is located at a position slightly ahead of the standard listening position of the user at the second seat in the second seat noise control device 4 as described above.

As described above, according to the present embodiment, it is possible to cancel the sound of the mutually uncorrelated audio source for the other seat with respect to the first seat and the second seat by using the same microphone 9 without providing a microphone 9 for each seat. In addition, it is possible to share the first seat speaker 7 and the second seat speaker 8 for the output of the sound of the audio source and the output of the cancel sound, so that the configuration of the in-vehicle system can be simplified.

Further, in the present embodiment, since the second seat noise control device 4 generates the cancel sound that cancels the sound of the first seat audio source 1 best at a position slightly ahead of the standard listening position of the sound by the user seated on the second seat, the first sound can be canceled satisfactorily even when the listening position of the user seated on the second seat is located in front of the standard sound listening position. Furthermore, in this case, in a case where the listening position of the user seated on the second seat is at a more rear position, such as the standard listening position, the cancellation effect is weakened. However, since the loudness of the sound of the first seat audio source 1 heard from the front of the listening position is also reduced, the occurrence of discomfort due to the weakened cancellation effect is suppressed.

In the above embodiment, two sets of the microphone 9, the first seat speaker 7, the second seat speaker 8, the first seat adder 5, the second seat adder 6, the first seat noise control device 3, and the second seat noise control device 4 may be provided, the sound of the second seat audio source 2 may be canceled for each of the left and right ears of the user at the first seat, and the sound of the first seat audio source 1 may be canceled for each of the left and right ears of the user at the second seat.

Figure 5C:
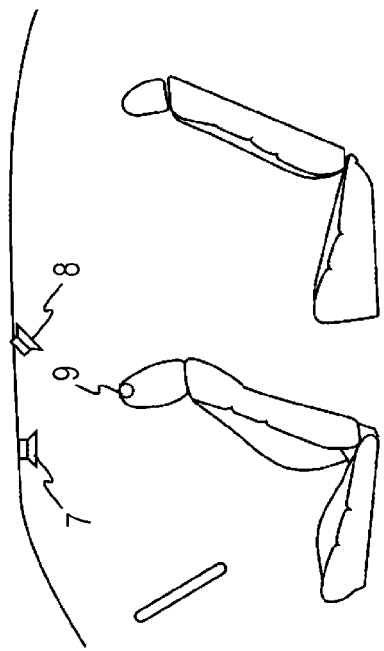
FIGS. 5A to 5D are diagrams illustrating other arrangement examples of speakers and microphones in the in-vehicle system according to the embodiment of the present invention.
Figure 5D:
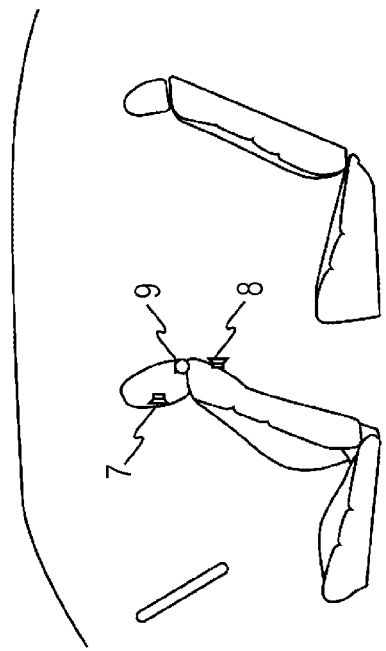
Figure 5A:
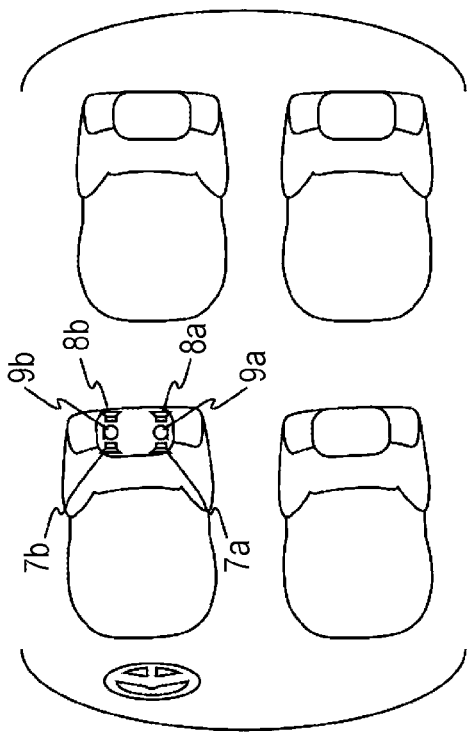

That is, in this case, for example, as shown in FIG. 5A, a first seat speaker 7a that emits sound toward the standard left ear position of the first seat user in the first set, a microphone 9a in the first set, and a second seat speaker 8a that emits sound toward the standard left ear position of the user of the second seat in the first set are arranged on the left side of the first headrest, and a first seat speaker 7b that emits sound toward the standard right ear position of the first seat user in the second set, a microphone 9b in the second set, and a second seat speaker 8b that emits sound toward the standard right ear position of the second seat user in the second set are arranged on the right side of the first headrest.

In this case, the first seat adaptive algorithm execution unit 32 of each of the first seat noise control device 3 of the first set and the first seat noise control device 3 of the second set performs an adaptive operation of updating the transfer function $W1(z)$ of the first seat variable filter 31 using both the signal output from the first seat subtractor 35 in the own set and the signal output from the first seat subtractor 35 in the other set as errors. The second seat adaptive algorithm execution unit 42 of each of the second seat noise control device 4 of the first set and the second seat noise control device 4 of the second set performs the adaptive operation of updating the transfer function $W2(z)$ of the second seat variable filter 41 with both the signal output from the second seat subtractor 45 in the own set and the signal output from the second seat subtractor 45 in the other set as errors.

Figure 5B:
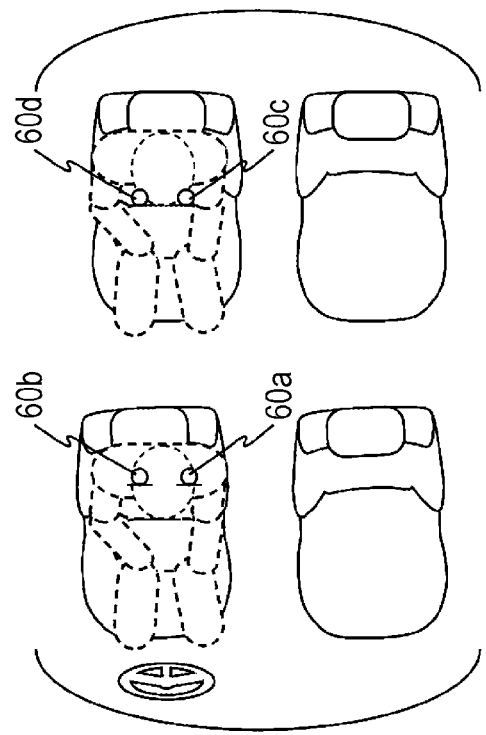

Further, in this case, as shown in FIG. 5B, using a first seat left learning microphone 60a arranged at the standard left ear position of the user in the first seat, a first seat right learning microphone 60b arranged at the standard right ear position of the user in the first seat, a second seat left learning microphone 60c arranged at a position slightly in front of the standard left ear position of the user in the second seat, and a second seat right learning microphone 60d arranged at a position slightly in front of the standard right ear position of the user in the second seat, a transfer function $H1(z)$ in which a difference between the output of the microphone 9a and the output in a case where the microphone 9a is located at the position of the first seat left learning microphone 60a is corrected by subtraction of the first seat subtractor 35 is obtained as the transfer function $H1(z)$ of the first seat auxiliary filter 34 of the first seat noise control device 3 of the first set, a transfer function $H1(z)$ in which a difference between the output of the microphone 9b and the output in a case where the microphone 9b is located at the first seat right learning microphone 60b is corrected by subtraction of the first seat subtractor 35 is obtained as the transfer function $H1(z)$ of the first seat auxiliary filter 34 of the first seat noise control device 3 of the second set, a transfer function $H2(z)$ in which a difference between the output of the microphone 9a and the output in a case where the microphone 9a is located at the position of the second seat left learning microphone 60c is corrected by subtraction of the second seat subtractor 45 is obtained as the transfer function $H2(z)$ of the second seat auxiliary filter 44 of the second seat noise control device 4 of the first set, and a transfer function $H2(z)$ in which a difference between the output of the microphone 9b and the output in a case where the microphone 9b is located at the position of the second seat right learning microphone 60d is corrected by subtraction of the second seat subtractor 45 is obtained as the transfer function $H2(z)$ of the second seat auxiliary filter 44 of the second seat noise control device 4 of the second set.

In the above embodiment, both the sound of the first seat audio source 1 and the cancel sound of the first seat noise control device 3 are output from the first seat speaker 7, and both the sound of the second seat audio source 2 and the cancel sound of the second seat noise control device 4 are output from the second seat speaker 8. The present invention is similarly applicable to a case where the sound of the first seat audio source 1 is output from a speaker separately provided in front of the first seat, the sound of the second seat audio source 2 is output from a speaker separately provided between the first seat and the second seat, only the cancel sound of the first seat noise control device 3 is output from the first seat speaker 7, and only the cancel sound of the second seat noise control device 4 is output from the second seat speaker 8.

The arrangement of the first seat speaker 7, the second seat speaker 8, and the microphone 9 in the present embodiment may be other than the arrangement shown in FIGS. 2A and 2B. For example, as illustrated in FIG. 5C, the first seat speaker 7 that emits sound toward the first seat may be provided at a position of the ceiling in the automobile in front of the headrest, the second seat speaker 8 that emits sound toward the second seat may be provided at a position of the ceiling in the automobile behind the headrest, and the microphone 9 may be provided at the headrest of the first seat.

Alternatively, as illustrated in FIG. 5D, the first seat speaker 7 may be provided in the front portion of the headrest of the driver's seat so as to emit sound forward, the second seat speaker 8 may be provided in the seat back of the driver's seat so as to emit sound backward, and the microphone 9 may be provided in the rear portion of the headrest of the driver's seat.

In any arrangement, the microphone 9 is preferably located between the first seat speaker 7 and the second seat speaker 8 in the front-rear direction. Preferably, the first seat speaker 7, the second seat speaker 8, and the microphone 9 are disposed at positions close to each other, so that influence of a change in a transmission path between the first seat speaker 7 and the microphone 9 and between the second seat speaker 8 and the microphone 9 is reduced.

The above embodiment can also be applied in a seat configuration in which the first seat and the second seat are arranged side by side. That is, in this case, for example, the left seat among the seats arranged side by side is the first seat, and the right seat is the second seat. As illustrated in FIG. 6A1, the first seat speaker 7 that emits sound toward the left, the microphone 9, and the second seat speaker 8 that emits sound toward the right are disposed between the first seat and the second seat in order from left to right.

In this case, as illustrated in FIG. 6A2, the learning microphone 60e is disposed at the standard right ear position of the user in the first seat to perform the first-stage learning processing of the transfer function H1(z) of the first seat auxiliary filter 34 in the first seat noise control device 3, and the learning microphone 60f is disposed at the standard left ear position of the user in the second seat to perform the first-stage learning processing of the transfer function H2(z) of the second seat auxiliary filter 44 in the second seat noise control device 4.

However, the first-stage learning processing of the transfer function H1(z) of the first seat auxiliary filter 34 of the first seat noise control device 3 can be performed by disposing the learning microphone 60 at the standard left ear position or the standard center position of the left and right ears of the user in the first seat, and the first-stage learning processing of the transfer function H2(z) of the second seat auxiliary filter 44 of the second seat noise control device 4 can be performed by disposing the learning microphone 60 at the standard right ear position or the standard center position of the left and right ears of the user in the second seat.

Further, in a case where the present embodiment is extended to apply to a configuration in which the first seat and the second seat are arranged side by side on the left and right sides, two sets of the microphone 9, the first seat speaker 7, the second seat speaker 8, the first seat adder 5, the second seat adder 6, the first seat noise control device 3, and the second seat noise control device 4 may be provided, the sound of the second seat audio source 2 may be canceled for each of the left and right ears of the user at the first seat, and the sound of the first seat audio source 1 may be canceled for each of the left and right ears of the user at the second seat.

That is, in this case, for example, as illustrated in FIG. 6B1, a first seat speaker 7c that emits sound toward the standard right ear position of the user in the first seat in the first set, a microphone 9c in the first set, and a second seat speaker 8c that emits sound toward the standard left ear position of the user in the second seat in the first set are disposed in order from left to right between the first seat and the second seat. In front of these, a first seat speaker 7d that emits sound toward the standard left ear position of the user in the first seat in the second set, a microphone 9d in the second set, and a second seat speaker 8d that emits sound toward the standard right ear position of the user in the second seat in the second set are disposed in order from left to right between the first seat and the second seat with respect to the left-right direction.

Further, in this case, as shown in FIG. 6B2, using a first seat left learning microphone 60g arranged at the standard left ear position of the user in the first seat, a first seat right learning microphone 60h arranged at the standard right ear position of the user in the first seat, a second seat left learning microphone 60j arranged at the standard left ear position of the user in the second seat, and a second seat right learning microphone 60k arranged at the standard right ear position of the user in the second seat, a transfer function H1(z) in which a difference between the output of the microphone 9c and the output in a case where the microphone 9c is located at the position of the first seat right learning microphone 60h is corrected by subtraction of the first seat subtractor 35 is obtained as the transfer function H1(z) of the first seat auxiliary filter 34 of the first seat noise control device 3 of the first set, a transfer function H1(z) in which a difference between the output of the microphone 9d and the output in a case where the microphone 9d is located at the first seat left learning microphone 60g is corrected by subtraction of the first seat subtractor 35 is obtained as the transfer function H1(z) of the first seat auxiliary filter 34 of the first seat noise control device 3 of the second set, a transfer function H2(z) in which a difference between the output of the microphone 9c and the output in a case where the microphone 9c is located at the position of the second seat left learning microphone 60j is corrected by subtraction of the second seat subtractor 45 is obtained as the transfer function H2(z) of the second seat auxiliary filter 44 of the second seat noise control device 4 of the first set, and a transfer function H2(z) in which a difference between the output of the microphone 9d and the output in a case where the microphone 9d is located at the position of the second seat right learning microphone 60k is corrected by subtraction of the second seat subtractor 45 is obtained as the transfer function H2(z) of the second seat auxiliary filter 44 of the second seat noise control device 4 of the second set.

The present embodiment can also be extensively applied to cancel the sound of the audio source of the passenger's seat in a case where the audio source of each seat has a plurality of channels.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An active noise control system applied to an environment in which a first sound that is a sound of a first sound source is output to a user seated on a first seat and a second sound that is a sound of a second sound source is output to a user seated on a second seat, the active noise control system comprising:
a first speaker;
a second speaker;
a microphone;
a first noise control device configured to output, from the first speaker, a first cancel sound that is a sound for canceling the second sound to the user seated on the first seat; and
a second noise control device configured to output, from the second speaker, a second cancel sound that is a sound for canceling the first sound to the user seated on the second seat, wherein
the first noise control device includes:
a first auxiliary filter configured to receive the second sound as an input;
a first correction unit configured to correct an output of the microphone using an output of the first auxiliary filter and output a first error signal; and
a first adaptive filter configured to receive the second sound as an input and perform an adaptive operation of updating a transfer function of the first adaptive filter with the first error signal as an error to generate the first cancel sound, a transfer function obtained in advance is set in the first auxiliary filter as a transfer function in which a component of the second sound included in the output of the microphone is corrected to a component of the second sound included in a sound transferred to a first cancel position that is a position that can be a listening position of a sound of the user seated on the first seat by correction of the first correction unit using the output of the first auxiliary filter, the second noise control device includes:

a second auxiliary filter configured to receive the first sound as an input;

a second correction unit configured to correct the output of the microphone using an output of the second auxiliary filter and output a second error signal; and a second adaptive filter configured to receive the first sound as an input and perform an adaptive operation of updating a transfer function of the second adaptive filter with the second error signal as an error to generate the second cancel sound, and the second auxiliary filter is set with a transfer function obtained in advance as a transfer function in which a component of the first sound included in the output of the microphone is corrected to a component of the first sound included in a sound transferred to a second cancel position that is a position that can be a listening position of a sound of the user seated on the second seat by correction of the second correction unit using the output of the second auxiliary filter.

2. The active noise control system according to claim 1, wherein the microphone is disposed at a position between the first speaker and the second speaker in a predetermined direction that faces from the first seat to the second seat.

3. The active noise control system according to claim 1, wherein the first speaker, the microphone, and the second speaker are disposed between a listening position of the sound of the user seated on the first seat and a listening position of the sound of the user seated on the second seat in a predetermined direction that faces from the first seat to the second seat, the microphone is disposed at a position between the first speaker and the second speaker in the predetermined direction, and the first sound is output from the first speaker to the user seated on the first seat, and the second sound is output from the second speaker to the user seated on the second seat.

4. The active noise control system according to claim 3, wherein the second seat is a seat behind the first seat, the second seat being aligned with the first seat in a front-rear direction, and the first speaker, the microphone, and the second speaker are provided at the first seat.

5. The active noise control system according to claim 4, wherein the first speaker and the microphone are provided in a headrest of the first seat, and the second speaker is provided in a headrest or a seat back of the first seat.

6. The active noise control system according to claim 2, wherein the second seat is a seat behind the first seat, the second seat being aligned with the first seat in a front-rear direction, and the first speaker, the microphone, and the second speaker are provided at the first seat.

7. The active noise control system according to claim 6, wherein the first speaker and the microphone are provided in a headrest of the first seat, and the second speaker is provided in a headrest or a seat back of the first seat.

8. The active noise control system according to claim 1, wherein the second seat is a seat behind the first seat, the second seat being aligned with the first seat in a front-rear direction, and the first speaker, the microphone, and the second speaker are provided at the first seat.

9. The active noise control system according to claim 8, wherein the first speaker and the microphone are provided in a headrest of the first seat, and the second speaker is provided in a headrest or a seat back of the first seat.

10. The active noise control system according to claim 3, wherein the second seat is a seat aligned with the first seat in a left-right direction.

11. The active noise control system according to claim 10, wherein at least one of the first speaker, the microphone, and the second speaker is disposed on a ceiling in a vehicle interior of the automobile.

12. The active noise control system according to claim 2, wherein the second seat is a seat aligned with the first seat in a left-right direction.

13. The active noise control system according to claim 12, wherein at least one of the first speaker, the microphone, and the second speaker is disposed on a ceiling in a vehicle interior of the automobile.

14. The active noise control system according to claim 3, wherein the second seat is a seat behind the first seat, the second seat being aligned with the first seat in a front-rear direction, and the first cancel position is a standard sound listening position of the user seated on the first seat, and the second cancel position is a position in front of the standard sound listening position of the user seated on the second seat and behind the first seat.

15. An active noise control system applied to an environment in which a first sound that is a sound of a first sound source is output to a user at a first location and a second sound that is a sound of a second sound source is output to a user at a second location in proximity to the first location, the active noise control system comprising:

a first speaker;
a second speaker;
a microphone;
a first noise control device configured to output, from the first speaker, a first cancel sound that is a sound for canceling the second sound to the user at the first location; and
a second noise control device configured to output, from the second speaker, a second cancel sound that is a sound for canceling the first sound to the user at the second location, wherein the first noise control device includes:

a first auxiliary filter configured to receive the second sound as an input;

a first correction unit configured to correct an output of the microphone using an output of the first auxiliary filter and output a first error signal; and a first adaptive filter configured to receive the second sound as an input and perform an adaptive operation of updating a transfer function of the first adaptive filter with the first error signal as an error to generate the first cancel sound, a transfer function obtained in advance is set in the first auxiliary filter as a transfer function in which a component of the second sound included in the output of the microphone is corrected to a component of the second sound included in a sound transferred to a first cancel position that is a position that can be a listening position of a sound of the user at the first location by correction of the first correction unit using the output of the first auxiliary filter, the second noise control device includes:

a second auxiliary filter configured to receive the first sound as an input;

a second correction unit configured to correct the output of the microphone using an output of the second auxiliary filter and output a second error signal; and a second adaptive filter configured to receive the first sound as an input and perform an adaptive operation of updating a transfer function of the second adaptive filter with the second error signal as an error to generate the second cancel sound, and the second auxiliary filter is set with a transfer function obtained in advance as a transfer function in which a component of the first sound included in the output of the microphone is corrected to a component of the first sound included in a sound transferred to a second cancel position that is a position that can be a listening position of a sound of the user at the second location by correction of the second correction unit using the output of the second auxiliary filter.

16. The active noise control system according to claim 15, wherein the microphone is disposed at a position between the first speaker and the second speaker in a predetermined direction that faces from the first location to the second location.

17. The active noise control system according to claim 15, wherein the first speaker, the microphone, and the second speaker are disposed between a listening position of the sound of the user at the first location and a listening position of the sound of the user at the second location in a predetermined direction that faces from the first location to the second location, the microphone is disposed at a position between the first speaker and the second speaker in the predetermined direction, and the first sound is output from the first speaker to the user at the first location, and the second sound is output from the second speaker to the user at the second location.

18. The active noise control system according to claim 17, wherein the first speaker, the microphone, and the second speaker are provided at the first location.

19. The active noise control system according to claim 17, wherein at least one of the first speaker, the microphone, and the second speaker is disposed above the users at the first and second locations.

* * * * *